United States Patent
Harvey et al.

(10) Patent No.: US 6,913,174 B1
(45) Date of Patent: Jul. 5, 2005

(54) DETACHABLE CARRY CLIP WITH SWIVEL FOR ELECTRONIC DEVICES

(75) Inventors: David Joseph Harvey, Duluth, GA (US); James K. Skurski, Gainesville, GA (US); Akira Takahashi, Duluth, GA (US)

(73) Assignee: Matsushita Mobile Communications Development Corporation of U.S.A., Suwanee, GA (US)

( * ) Notice: Subject to any disclaimer, the term of this patent is extended or adjusted under 35 U.S.C. 154(b) by 0 days.

(21) Appl. No.: 09/912,212

(22) Filed: Jul. 24, 2001

(51) Int. Cl.$^7$ .............................................. A01K 97/04
(52) U.S. Cl. ...................... 224/197; 224/271; 224/930; 455/100; 455/575.6; 379/446
(58) Field of Search .................. 224/197, 271, 224/272, 553, 929, 930; 455/90, 100, 351, 575.6; 379/446, 454, 455; 248/223.41, 224.51, 224.61

(56) References Cited

U.S. PATENT DOCUMENTS

| | | | |
|---|---|---|---|
| 5,014,892 A | | 5/1991 | Copeland ..................... 224/271 |
| 5,241,592 A | * | 8/1993 | Carlson et al. .............. 361/814 |
| 5,540,368 A | | 7/1996 | Oliva .......................... 224/271 |
| 5,597,102 A | * | 1/1997 | Saarikko et al. ............. 224/191 |
| 5,620,120 A | | 4/1997 | Tien ............................ 224/199 |
| 5,730,342 A | | 3/1998 | Tien ............................ 224/271 |
| 5,787,341 A | * | 7/1998 | Parkas et al. ................ 224/191 |
| 5,799,847 A | | 9/1998 | Sandor ........................ 224/197 |
| 5,833,100 A | | 11/1998 | Kim ............................ 224/197 |
| 5,850,954 A | | 12/1998 | Dong-Joo .................... 224/197 |
| 5,850,996 A | * | 12/1998 | Liang .......................... 224/197 |
| 5,906,031 A | | 5/1999 | Jensen ......................... 24/3.12 |
| 6,006,969 A | | 12/1999 | Kim ............................ 224/197 |
| 6,059,156 A | | 5/2000 | Lehtinen ..................... 224/197 |
| 6,305,588 B1 | * | 10/2001 | Michel et al. ............... 224/195 |
| 6,364,184 B1 | * | 4/2002 | Hauck et al. ................ 224/197 |

* cited by examiner

Primary Examiner—Stephen K. Cronin
(74) Attorney, Agent, or Firm—Needle & Rosenberg, P.C.

(57) ABSTRACT

A detachable carry clip assembly for an electronic device. The electronic device includes a housing and a power pack. The housing includes a power pack seat for receiving and retaining the power pack. A first portion of a member of the carry clip assembly couples into a recess on the top exterior of the electronic device and a second portion of a member extends into the power pack seat and is captured between the housing and the power pack when the power pack is received and retained in the power pack seat. The detachable carry clip assembly is detached from the electronic device by detaching the power pack from the power pack seat of the electronic device.

11 Claims, 4 Drawing Sheets

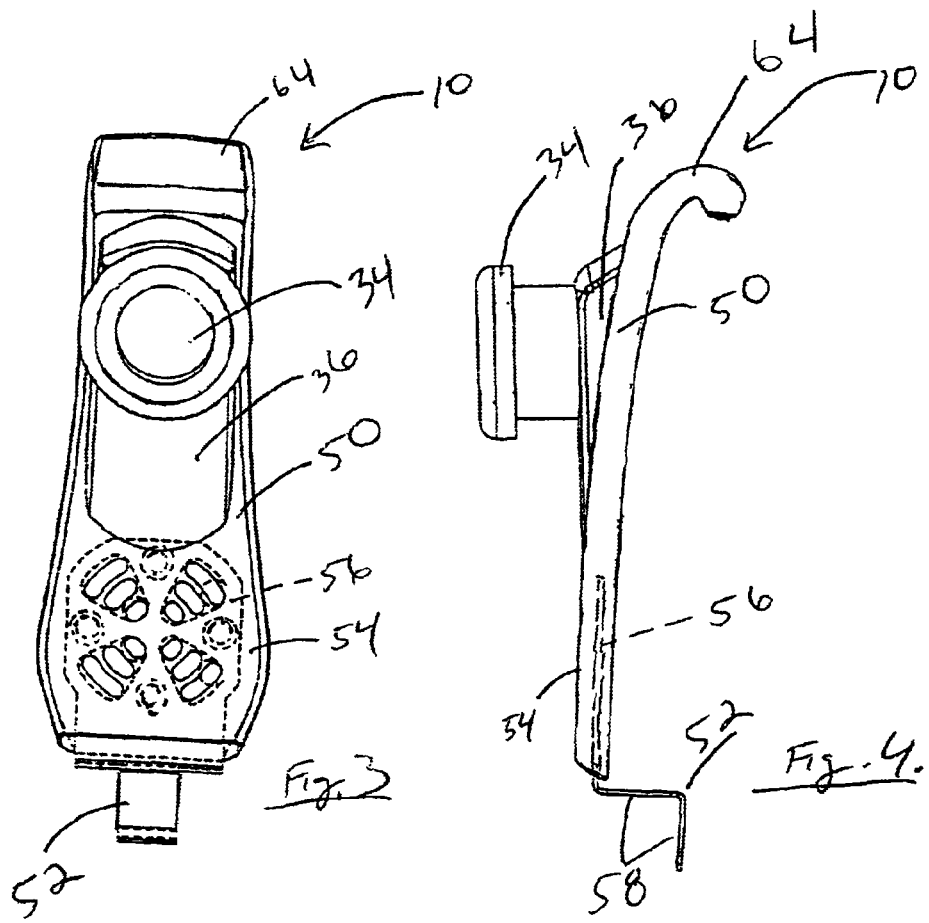
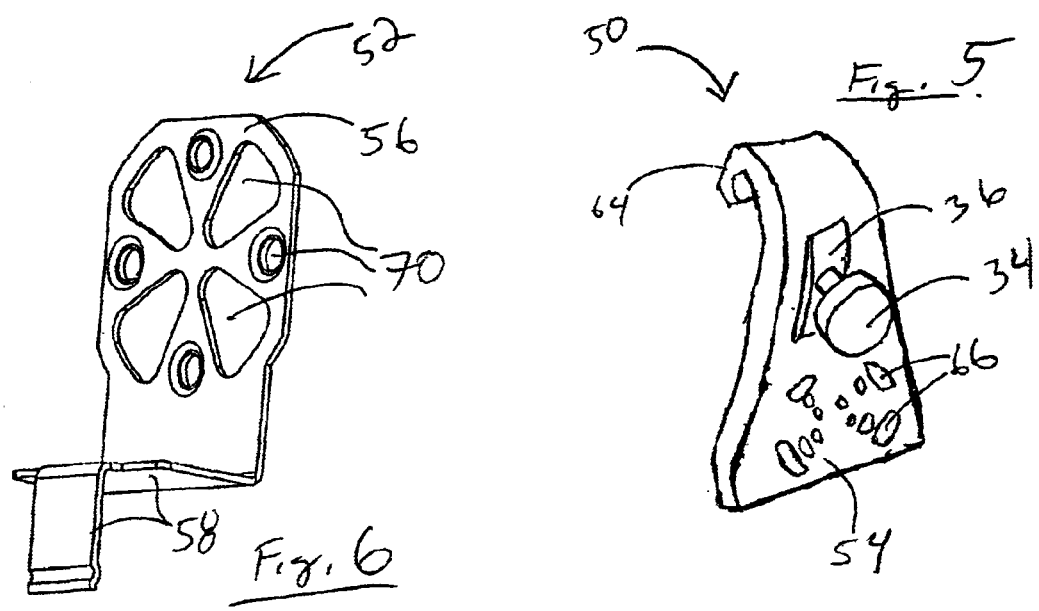

DETACHABLE CARRY CLIP WITH SWIVEL FOR ELECTRONIC DEVICES

TECHNICAL FIELD

This invention relates in general to a carry clip for portable electronic devices and more particularly to a carry clip which may be detachably secured to the electronic device.

BACKGROUND OF THE INVENTION

Portable electronic devices generally include a permanent swivel attached to the back of the housing of the electronic device. However, some known electronic devices do instead include a detachable swivel. Examples of these known devices are U.S. Pat. No. 5,597,102 to Saarikko et al. and U.S. Pat. No. 5,787,341 to Parkas et al. In the Saarikko et al. patent, a carry clip is bent around both of the longitudinal edges of the casing of the electronic device. Both ends of the clip are bent around the longitudinal edges to correspond with the shape of the device. Also, the ends of the clip are configured such that they grip the groove-like means at a joint formed between front and back covers of the casing of the device. Therefore, this known device requires that both longitudinal sides be utilized to secure the swivel to the electronic device which jeopardizes its compactness and, as portable electronic devices become smaller, greater flexibility of a product's design is needed.

The Parkas et al. device discloses a swivel with a unshaped fitting piece inserted at a boundary between the rear cover and the power pack. An exterior portion of the fitting piece rests against the outer surface of the rear cover and an interior second portion 52 of the fitting piece rests along the inner surface of an interior cavity behind the rear cover. The swivel, in this case, is therefore secured in place as a result of the u-shaped fitting piece's engagement with the casing of the electronic device rather than as a result of the power pack being inserted into and maintained onto the casing of the electronic device.

Accordingly, there is a need for a detachably securable swivel which secures to no more than one side of the electronic device to provide greater flexibility for incorporating additional features without compromising its reduced size and which may be more easily secured to the electronic device.

SUMMARY OF THE INVENTION

The present invention solves the above-identified problems by providing a detachable carry clip with swivel configured to engage a single edge of an electronic device which may be detachably secured to the electronic device merely by engaging and disengaging the power pack to and from the power pack seat in the housing of the electronic device, respectively.

Generally described, the detachable carry clip of the present invention includes an elongated member having first and second portions. The first portion of the elongated member of the carry clip assembly locks into a recess in the exterior of the electronic device and the second portion of the elongated member extends into the power pack seat to be captured between the housing and the power pack when the power pack is received and retained in the power pack seat. The detachable carry clip assembly is detached from the electronic device by detaching the power pack from the power pack seat of the electronic device.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

BRIEF DISCRIPTION OF THE DRAWINGS

FIG. 3 is a front view illustrating one embodiment of the detachable carry clip assembly of the present invention.

FIG. 4 is a side view of the detachable carry clip assembly of FIG. 3.

FIG. 5 is a close up view illustrating one embodiment of a first portion of the detachable carry clip assembly of the present invention.

FIG. 6 is a close up view illustrating one embodiment of a second portion of the detachable carry clip assembly of the present invention.

Similar reference characters refer to similar parts throughout the several views of the drawings.

DESCRIPTION OF A PREFERRED EMBODIMENT

Figure 1:
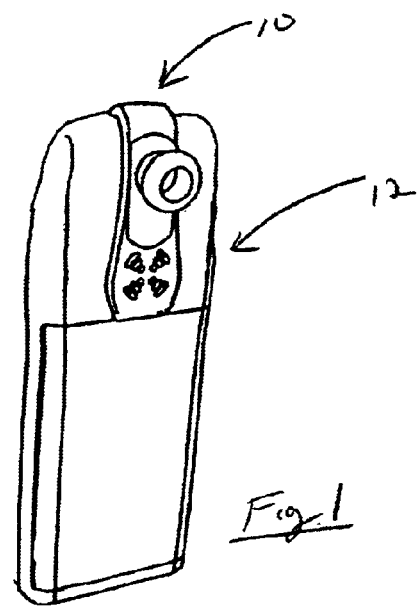
FIG. 1 is a perspective view of a portable electronic device having a detachable carry clip with swivel according to the present invention.

Referring now to the drawings in which like numerals indicate like elements throughout the several views, FIG. 1 illustrates an exemplary embodiment of a detachably carry clip assembly 10 of the present invention in use on a portable electronic communication device 12 including a housing 14 and a power pack 16. Preferably, the portable communication device 12 is a portable cellular telephone having a small profile.

Figure 2:
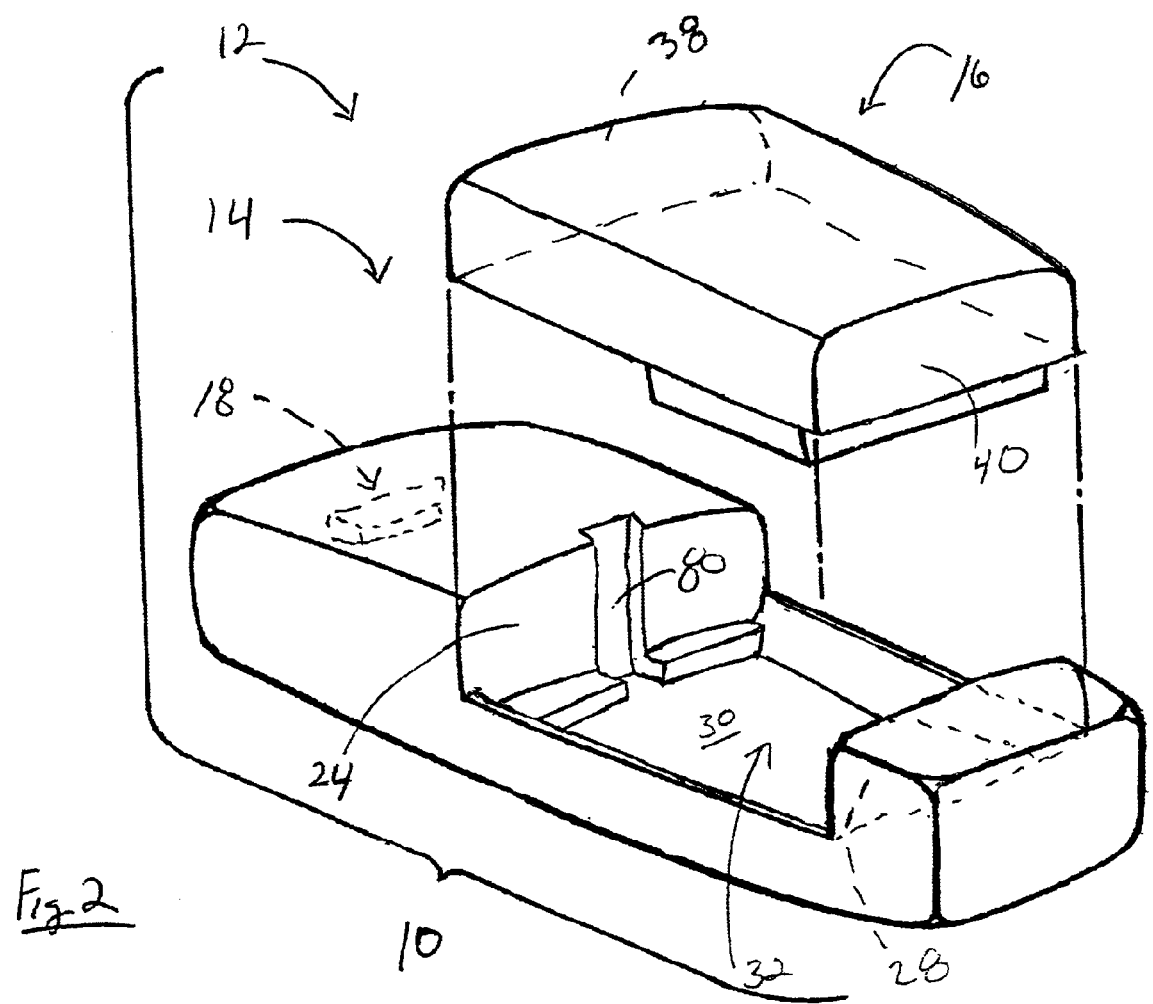
FIG. 2 is a perspective view illustrating the power pack displaced from the portable electronic communication device according to the present invention.

As best shown in FIG. 2, housing 14 includes an inner vertical wall defining a front power pack abutment 24 and another vertical wall defining a back battery abutment 28. Housing 14 also includes a planar surface 30 which abuts the left and right peripheries of the housing 12 to form a bottom. The front power pack abutment 24, back power pack abutment 28, and planar surface 30 define a power pack seat 32 configured to receive the power pack 16.

Power pack 16 is preferably a rechargeable battery pack such as a nickel cadmium or lithium ion battery. However, other types of battery technology may be used such as rechargeable or disposable primary metal-air batteries. Power pack 16 includes front vertical wall 38 and back vertical wall 40 which will face front power pack abutment 24 and back power pack abutment 28, respectively.

In the preferred embodiment, as best shown in FIGS. 3 and 4, the detachable carry clip assembly 10 includes a member having a first portion 50 and a second portion 52 which are coupled to one another as explained in greater detail below. On one side of the first portion 50 is the swivel 34 which is mounted in any manner known in the industry. Preferably, the side of the first portion 50 from which the swivel 34 extends includes a protruding portion 36 which orients the swivel 34 in a manner to engage and be received in a known slotted element (not shown) typically worn on a belt.

A proximal end 54 of the first portion 50 includes an opening therethrough which extends partially through the length of the first portion 50. The opening in the first portion 50 is configured to receive a proximal end 56 of the second portion 52. FIGS. 3 and 4 illustrate the proximal end of the second portion 52 received and retained in the opening in the first portion 50. This may be accomplished by insert-molding the proximal end 56 of the second portion 52 in the first portion 50.

Figure 7:
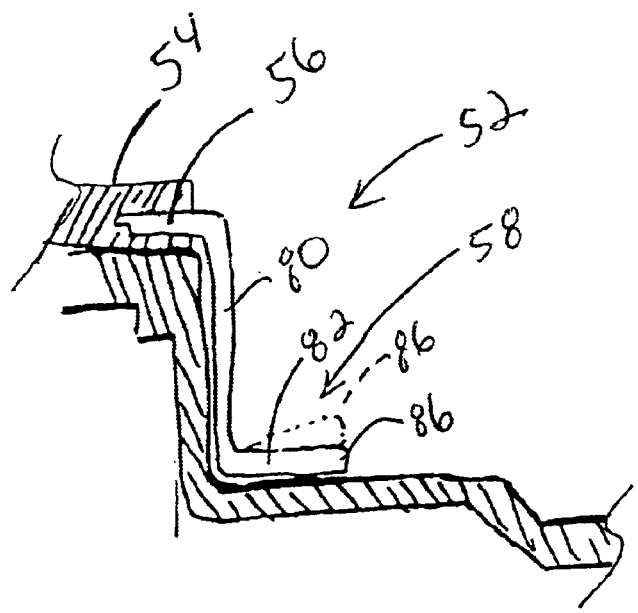
FIG. 7 is a partial cross-sectional view illustrating the position of the second portion of FIG. 6 when in the power pack seat.
Figure 9:
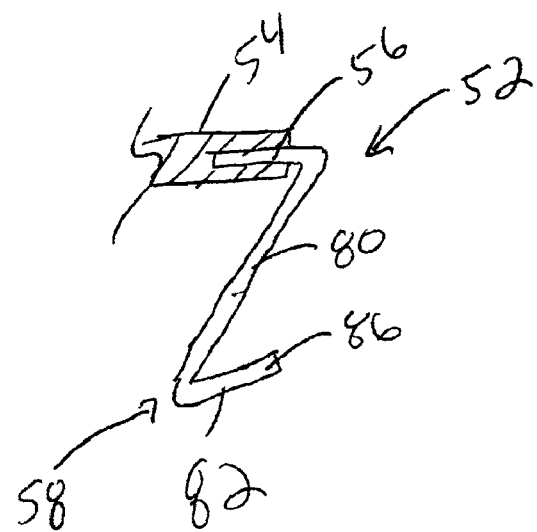
FIG. 9 is a side view illustrating an alternative embodiment of the second portion of the present invention.
Figure 8:
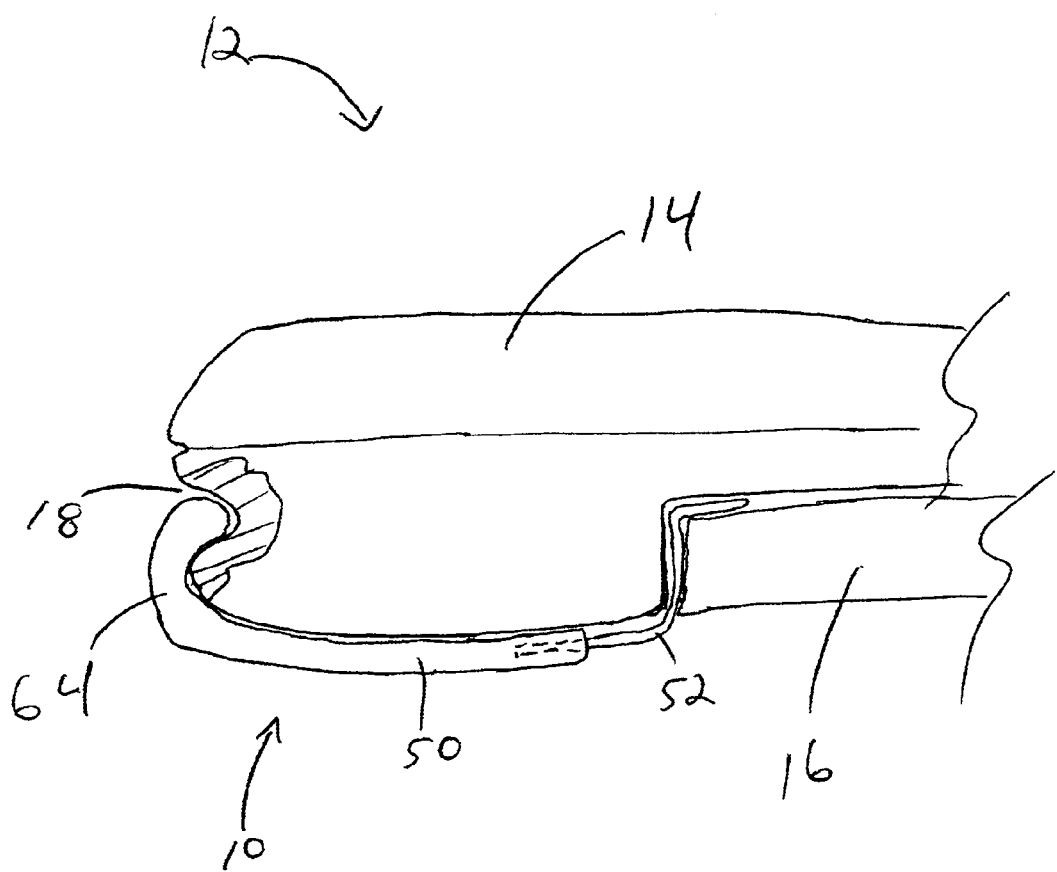
FIG. 8 is a partial view illustrating the first portion of the present invention retained in a recess on the top of the electronic device.

However, FIGS. 5 and 6 separately illustrate first and second portions 50 and 52, respectively. The first portion 50 is preferably made of any hard plastic material, such as PC or PC/ABS plastic typically used in the industry. However, the second portion 52 is made up of any material, such as plastic or metal, which has a semi-resilient property to permit a distal end 58 of the second portion 52 to be somewhat bendable, but biased to remain in a particular configuration when placed in the power pack seat 32. The preferred configurations of the second portion 52 relative to the power pack seat 32 are shown in FIGS. 7–9, described in greater detail below.

The first portion 50 is configured to engage a pocket or recess 18 in the top of the communications device 10 as shown in FIG. 1. As best shown in FIG. 4, a distal end 64 of the first portion 50 is preferably curved inward to allow itself to be hooked into the recess 18 in the top of the communications device 12. The carry clip assembly 10 is otherwise free of any other means for permitting itself to be secured to the exterior of the electronic communications device 12. In the preferred embodiment, the distal end 64 of the first portion 50 extends from the back, over the top, and then into the front of the communications device 12. In one embodiment, the distal end 64 of the first portion 50 may grip the groove-like means at the joint between the front and back covers defining the housing 14 of the communications device 12.

In FIG. 5, the first portion 50 includes a plurality of openings 66 therethrough. Preferably, the plurality of openings 66 is arranged in groups of an equal number of openings 66 which are spaced equidistant apart from one another. More preferably, the openings 66 of each group are arranged along a radius extending from a central point substantially located at the center of the plurality of openings 66.

The openings 66 on the first portion 50 correspond with a plurality of openings 70 included on the second portion 52 when the first and second portions 50, 52 are coupled to one another. FIG. 3 best illustrates the openings 66 corresponding with openings 70. The plurality of openings 66 and 70 cooperate with one another to permit sound to easily pass through the clip assembly 10 when the clip assembly 10 is attached to the portable electronic communications device 12. The openings 66 and 70 are preferably oriented on the clip assembly 10 such that the sound emitted from a speaker (not shown) in the back of the communications device 12 will not be obstructed. In one embodiment, one of the openings 70 on the second portion 52 is sized to correspond with at least two of the openings 66 on the first portion 50 such that the openings 66 may remain relatively small and practically unnoticed on the exterior of the clip assembly 10. In FIG. 3, the openings 70 and the proximal end 56 of the second portion 52 are shown in phantom to better illustrate a single opening 70 corresponding with more than one opening 66.

Referring now to the second portion 52 in particular, the distal end 58 of the second portion 52 includes a web portion 80 extending in one direction and a flange portion 82 extending from the web portion 80 in a second direction relative to the first direction. In one embodiment, the web portion 80 extends at substantially a 90 degree angle relative to the opposite end of the second portion 52. FIGS. 4 and 6 best illustrate the relative directions and angles of the web and flange portions 80 and 82. However, the angle of the web portion 80 relative to the opposite end of the second portion 52 may be somewhat less than 90 degrees as described below.

Turning now to FIG. 7, a partial cross-sectional view of the power pack seat 32 of the housing 14 illustrates the relative position of the distal end 58 of the second portion 52 as it extends into the power pack seat 32 when the carry clip assembly 10 is attached to the communications device 12. As shown in FIG. 7, the web portion 80 extends substantially along side and down the height of the front abutment 24 of the power pack seat 32. Although the abutment 24 and the web portion 80 are shown as being substantially vertical in FIG. 7, they may alternatively be sloped to one side or the other depending upon the configuration of the power pack seat 32 and the corresponding power pack 16. In any case, the web portion 80 should be maintained against the abutment 24 with a minimum of obstruction to the power pack when the power pack 16 is received and retained in the power pack seat 32. This may be accomplished by having web and flange portions 80 and 82 be a minimum of thickness.

However, in one embodiment, a channel 80 may be formed in the abutment 24 to accommodate the thickness of the web and flange portions 80 and 82. FIG. 2 best illustrates the channel 80 which has a portion extending along the entire height of the abutment 24 and another portion which partially extends along the length of the planar surface 30 of the housing 14.

In operation, to detachably secure the carry clip assembly 10 to the electronic communications device 12, the power pack 16 is first removed from the power pack seat 32. The carry clip assembly 10 is then positioned on the communications device 12 so that the distal end 64 of the first portion 50 of the carry clip assembly 10 is coupled to the top exterior of the communications device 12, as explained above. The distal end 58 of the second portion 52 extends into the power pack seat 32 and web portion 80 is positioned against the front abutment 24 of the housing 14. The power pack 16 is then realigned with the power pack seat 32 and latched into place by means known in the industry for attaching and detaching power packs to housings.

When pressing the power pack 16 inward, the power pack's own contact with the distal end 58 of the second portion 52 causes the web portion 80 to be captured between the abutment 24 and the front vertical wall 38 of the power pack 16 and the flange portion 82 to be captured underneath the power pack 16 to lie against the planar surface 30 of the housing 14. By removing the power pack 16 from the power pack seat 32, the carry clip assembly 10 may be detached from the communications device 12 as a result the second portion 52 no longer being held into place by the power pack 16 attached to the housing 14.

As shown in FIG. 7, a distal end 86 of the flange portion 82 of the second portion 52 may be biased to extend somewhat outward from the planar surface. The position of the distal end 86 of the flange portion 82 extending outward is shown in phantom in FIG. 7. However, when the power pack 16 is received and retained in the power pack seat 32, the distal end 86 of the flange portion 82 would be depressed as shown in FIG. 7. As a result of the distal end 86 of the flange portion 82 being biased to extend outward, greater grasping force may be obtained on the communications device 12 by the carry clip assembly 10 because the power pack's depressing of the distal end 86 causes the carry clip assembly 10 to outwardly bow or arch at the juncture of the first and second portions 50 and 52 and, therefore, the distal end 64 of the first portion 50 to be urged inward against the exterior of the communications device 12 and into recess 18. FIG. 8 best illustrates the distal end 64 in recess 18. Once the power pack 16 is removed from power pack seat 32, the distal end 86 of the flange portion 82 returns to its outwardly extending position as a result of the distal end 86's bias.

In an alternative embodiment, the second portion 52 may be substantially z-shaped so that the web portion 80 is inwardly biased as shown in FIG. 9. In such case, the portion of the web portion 80 extending furthest down into the power pack seat 32 along the abutment 24 would be urged against the abutment 24. Therefore, the combination of the biased web portion 80 with the biased flange portion 82 could provide a greater grasping force compared to the carry clip assembly 10 described above having only a biased flanged portion 82 when the power pack 16 is received and retained in the power pack seat 32.

The present invention has been illustrated in relation to particular embodiments which are intended in all respects to be illustrative rather than restrictive. Those skilled in the art will recognize that the present invention is capable of many modifications and variations without departing from the scope of the invention. Accordingly, the scope of the present invention is described by the claims appended hereto and supported by the foregoing.

What is claimed is:

1. A detachable carry clip assembly for an electronic device having a housing and a power pack, the housing having a power pack seat for receiving and retaining the power pack, said detachable carry clip assembly comprising:
a member having means for coupling to a single edge of the exterior of the electronic device and means for extending into the power pack seat to be captured between the housing and the power pack when the power pack is received and retained in the power pack seat, said member being otherwise free of means for coupling to the exterior of the electronic device, whereby said detachable carry clip is detached from the electronic device by detaching the power pack from the power pack seat of the electronic device, wherein said member comprises a first portion having said coupling means and a second portion having said extending means, said first portion being coupled to said second portion when said carry clip assembly is attached to the electronic device, and wherein a proximal end of said first portion includes an opening extending partially through the length of said first portion and configured to receive a proximal end of said second portion.

2. The detachable carry clip assembly of claim 1 wherein said second portion is semi-resilient.

3. The detachable carry clip assembly of claim 1 wherein a distal end of said second portion comprises a web portion extending in one direction and a flange portion extending from said web portion in a second direction relative to said first direction.

4. The detachable carry clip assembly of claim 1 wherein said second portion is substantially z-shaped.

5. The detachable carry clip assembly of claim 1 wherein said power pack seat is partially defined by a planar surface and wherein said extending means extends underneath the power pack to lie against said planar surface when the power pack is retained in the power pack seat.

6. The detachable carry clip assembly of claim 1 wherein said housing defines a channel for receiving a portion of said second portion.

7. The detachable carry clip assembly of claim 6 wherein said channel is at least partially defined by a front abutment defining said power pack seat.

8. The detachable carry clip assembly of claim 1 wherein said first and second portions each comprise a plurality of openings therethrough, said openings of said first portion corresponding with said openings of said second portion when said first and second portions are coupled to one another.

9. The detachable carry clip assembly of claim 8 wherein one of said openings in said second portion is sized to correspond with at least two of said openings in said first portion.

10. The detachable carry clip assembly of claim 8 wherein said openings in said first portion are divided into groups of an equal number of said openings, each said group being spaced equidistant from one another.

11. An electronic device comprising:
a housing defining a power pack seat;
a power pack adapted to be received within said power pack seat;
a detachable carry clip assembly comprising:
a member having means for coupling to a single edge of the exterior of said electronic device and means for extending into said power pack seat to be captured between said housing and said power pack when said power pack is received and retained in said power pack seat, said member being otherwise free of means for coupling to the exterior of said electronic device, whereby said detachable carry clip is detached from said electronic device by detaching the power pack from the power pack seat of the electronic device, wherein said member comprises a first portion having said coupling means and a second portion having said extending means, said first portion being coupled to said second portion when said carry clip assembly is attached to the electronic device, and wherein a proximal end of said first portion includes an opening extending partially through the length of said first portion and configured to receive a proximal end of said second portion.

* * * * *